Oct. 31, 1944.   J. GRABEC   2,361,682
METHOD OF MANUFACTURING COMPOSITE SHEET MATERIAL
Original Filed June 4, 1935
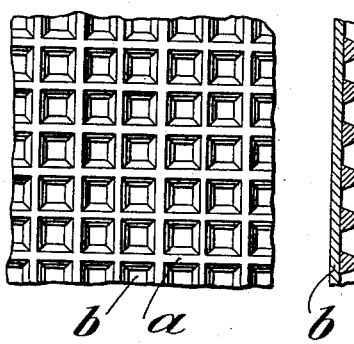
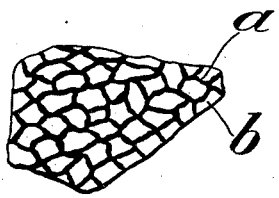
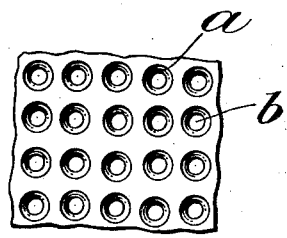
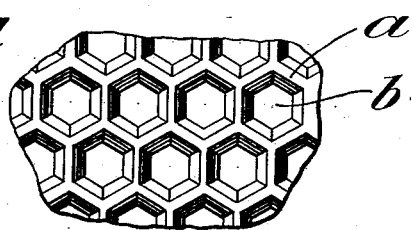
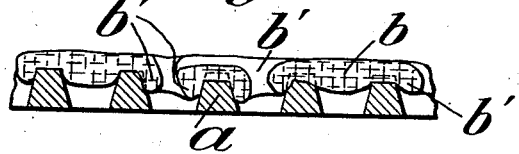
Inventor:
JOSEF GRABEC
By Theodore C. Browne
Attorney.

Patented Oct. 31, 1944

2,361,682

UNITED STATES PATENT OFFICE 2,361,682

METHOD OF MANUFACTURING COMPOSITE SHEET MATERIAL

Josef Grabec, Bratislava, Slovakia; vested in the Alien Property Custodian

Original application June 4, 1935, Serial No. 24,943. Divided and this application January 6, 1941, Serial No. 373,283. In Austria August 25, 1934

3 Claims. (Cl. 154—2)

This invention relates to an elastically distensible composite material which is pervious to air, and which consists of one or more plies of distensible textile fabric such as stockinette and the like, and at least one layer of foraminous elastic material such as rubber or its equivalents.

Composite sheet materials have already become known which consist of a perforated rubber sheet to both sides of which there are applied, by means of layers of adhesives, plies of distensible textile fabric such as stockinette. It has also been proposed to stick together textile material and a rubber sheet and then to perforate the composite sheet material thus formed. This however involves mechanically damaging the textile fabric used and destroying the character of the textile surface. Further, it is known to work up textile-covered rubber threads into fabrics, but the manufacturing of such products is cumbrous and expensive.

The products according to the present invention are distinguishable from known products of a similar nature by the fact that the textile fabric is firmly attached, at least on one side, to a coherent system of press-molded rib-like elements of suitable breadth and height made of elastic material (such as rubber) in which the apertures between these elements are of such size that there are at least one hundred thereof to the square inch. The height and cross-section of the webs of the elastic material are determined by the desired resistance of the finished material to distension; in order to attain the powerful elasticity required for example in orthopaedic corsets and the like it is necessary for the webs to be 1 mm. and more in height. The term "elastic material" as here used is to be understood to mean any material or composition of matter having the property of elasticity and capable of conversion from a deformable into a more or less permanently elastic state. The process serving for this conversion will hereinafter be termed "vulcanization," although it is to be understood that this term is not to be considered as limited in scope to the processes and means now commonly employed in connection with rubber alone.

The breadth of the rib-like webs of the layer of elastic material employed depends in any particular instance on the shape and number of the apertures and/or on the pattern adopted therefor. These webs should, however, be kept as narrow as possible, since wide webs not only detract from the ventilating properties of the composite material according to the invention, but also reduce its suitability for taking stitches when sewn in a sewing machine.

The uncovered surface of the textile fabric used should be as large as possible, and should preferably amount in all to at least 50% of the entire surface.

The webs formed from the elastic material by pressure molding should preferably take the form of a repeat pattern structure, and thus contribute at the same time to the formation of a superficial pattern or texture on the finished product of the invention.

The decorative effect can also be enhanced by making the layer of elastic material of a color different from that of the textile fabric backing.

In order to increase the decorative effect of the system of rib-like webs, the surface of the layer of elastic material furthest removed from the textile fabric can be provided with ornamental devices, impressions, grooves, points, and the like.

If it is desired that both sides of the composite sheet material shall present the appearance of textile fabric, a further ply of textile fabric can be applied to the uncovered side of the layer of elastic material.

To obtain firmer adherence in the case of certain textile fabrics the textile fabric used may be preliminarily treated with a suitable solution of elastic material, care being taken to prevent the holes between the stitches from becoming clogged. The employment of this expedient becomes seldom necessary however.

The manufacturing of the product according to the present invention is preferably carried out by forming the webs from the elastic material used, and uniting the same to the textile fabric in a single working stage.

The material according to the invention is manufactured by compressing together alternate sheets of distensible textile fabric and elastic material (such as rubber) in a deformable state, that is to say at least one of each such sheets, in a preheated molding device the die member of which is suitably profiled to form the desired fine rib-like webs and intervening apertures in the resulting composite sheet material. This operation also serves normally to effect the uniting of the layer of elastic material to the textile fabric ply, and its duration is determined by the requirement of effecting these two purposes, namely the molding of the webs and the satisfactory combining of the layer of elastic material with the textile fabric ply. The vulcanization of the elastic material can be effected either simultaneously with the molding operation or subsequently thereto.

In order to obtain continuous working, the said molding device is preferably made with the pressing members in the form of rolls. In this case a profiled roll serves as the die, and a counter roll as the platen of the device, and the textile fabric ply and the sheet of elastic material (such as rubber) are passed together between these heated rolls. The speed of rotation of these rolls should be so determined that time is allowed for the formation of the webs, for their attachment to the textile fabric backing, and also if desired for vulcanization, in a single uninterrupted working operation. It will be clear that it is equally possible in accordance with the invention to produce composite sheet material consisting of a layer of elastic material with a covering ply of textile fabric on each side or of say two layers of elastic material with one intervening ply of textile fabric.

Particularly valuable products in accordance with the invention are those consisting of a geometrical system of intersecting rib-like webs of the elastic material used and at least one ply of distensible textile fabric, and in which at least some of the threads of the textile fabric are intermingled with the webs of the elastic material. These new products are distinguishable from others of a similar nature by the fact that the intermingled threads of the textile fabric, or at least a part thereof, become adapted to the shape of or enter into the structure of the webs of elastic material constituting the said geometrical system.

These particularly valuable and distinctive products can be produced in a simple manner in a single working operation by subjecting the sheet of elastic material in a deformable state placed upon or between a ply or plies of distensible textile fabric to a pressure molding operation using pressing implements or dies having pointedly tapered ends for instance of pyramidal or conical shape. It has transpired that the plies of textile fabric are in no way damaged by such implements, and that the threads merely become laterally displaced and rearranged by the tapered entering ends of the die elements. This applies more particularly in the case of the upper ply of textile fabric facing the molding implement or die. In this manner there is obtained in the first place very much improved ventilation, and in the second place there is obtained a novel and distinctive type of surface texture which can no longer be designated as being that of a regular textile body, since in it the threads of the textile fabric and the molded webs of the intermediate layer of elastic material are intimately combined and intermingled. The majority of the threads of the superposed ply of textile fabric thus undergo rearrangement, with the result that a product is obtained which is entirely different in character from that obtained by merely sticking a layer of elastic material on to textile fabric. The textile threads thus become for the greater part embedded in the elastic material, are nevertheless elastic, but on the other hand can no longer become displaced relatively to each other; thus in the described manner there is obtained in a single working operation a gauze-like product in which a distensible textile fabric and elastic material are combined to form a uniform whole. A preferred arrangement is also that in which a layer of elastic material is located between two plies of textile fabric. The under ply of textile fabric which comes in contact with the platen portion of the pressure molding device remains unaffected in appearance or structure and merely becomes attached to the intermediate layer of elastic material. If desired, the pressure molding can also be effected from both sides simultaneously, and in this case a product of altered appearance is obtained; it is also possible to employ more than two plies of textile fabric with an intermediate layer of elastic material between each pair thereof, and to treat the same in the described manner, the pressure molding being effected from one or from both sides. It is particularly advantageous in this connection to employ molding implements of the described nature in the form of rolls, which permit of the production of the new composite material in a simple manner, in a continuous sheet, and in a single working operation, and which permit of effecting vulcanization either simultaneously with or immediately subsequent to the molding process. The number and size of the apertures left between the webs of the elastic material may vary according to the purpose for which the finished composite material is to be used, but the finished material has at least 100 such apertures per square inch.

One of the outstanding technical advantages of the new products according to the present invention over other known products is their admirable suitability for direct sewing.

In the accompanying drawing, which forms part of this specification, Figs. 1 to 4 show on an enlarger scale several examples of designs for the system of webs of the elastic material in a product according to the invention composed of a ply of textile fabric and a layer of elastic material, in plan view. Figs. 5 and 6 show on an enlarged scale cross-sections of types of the composite sheet material according to the invention in which the textile threads are partly intermingled with the elastic material. The textile threads are in this case partly "intermolded" more or less indiscriminately in and with the regular webs formed from the elastic material.

In the figures of the drawing, $a$ denotes the layer of elastic material formed of intersecting rib-like webs, and $b$ the ply of textile fabric, while $b'$ denotes points at which textile threads are intermolded with the layer of elastic material. $c$ denotes the under or backing layer of textile fabric, and $c'$ certain points at which threads pertaining to this ply are intermolded with the webs of the layer of elastic material.

The present application is a division of applicant's copending application, Serial Number 24,943, filed June 4, 1935, Patent Number 2,275,425.

I claim:

1. Process for making an elastic laminated fabric comprising adhesively uniting an incompletely vulcanized rubber sheet and a sheet of elastic textile fabric, forming a plurality of tapered apertures into said rubber sheet, terminating in the plane of adhesion between said rubber sheet and said textile fabric sheet, and completing the vulcanization of said rubber sheet.

2. A process of producing a composite sheet of material which consists in providing a layer of textile fabric material having a coating of unvulcanized rubber, displacing said fabric material and rubber coating in the plane of said sheet to form an intersecting rib-like structure having tapered apertures between said ribs, wherein the rib-like structure forms a minor portion of the total area of the sheet, and completing the vulcanization of said rubber sheet.

3. Process for making an elastic sheet of laminated fabric comprising adhesively uniting an incompletely vulcanized rubber layer and a ply of elastic textile fabric, forming a plurality of tapered apertures in said rubber layer terminating in the plane of adhesion between said layer and ply, displacing the rubber layer material in the plane of the sheet during the formation of said apertures to thereby form an intersecting rib-like structure wherein the rib-like structure comprises a minor portion of the total sheet area, and completing the vulcanization of said rubber layer.

JOSEF GRABEC.